US 8,285,855 B2

(12) United States Patent
Lyndersay et al.

(10) Patent No.: US 8,285,855 B2
(45) Date of Patent: Oct. 9, 2012

(54) SYSTEM, METHOD AND USER INTERFACE FOR NETWORK STATUS REPORTING

(75) Inventors: Sean O. Lyndersay, Seattle, WA (US); Deon C. Brewis, Redmond, WA (US); Jean-Pierre Duplessis, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1022 days.

(21) Appl. No.: 11/067,016

(22) Filed: Feb. 28, 2005

(65) Prior Publication Data
US 2006/0026289 A1   Feb. 2, 2006

Related U.S. Application Data

(60) Provisional application No. 60/592,526, filed on Aug. 2, 2004.

(51) Int. Cl.
G06F 3/048 (2006.01)
G06F 15/16 (2006.01)
G06F 15/173 (2006.01)
G06F 15/177 (2006.01)
H04L 12/66 (2006.01)

(52) U.S. Cl. ........ 709/228; 370/463; 709/224; 715/735; 715/736; 715/772

(58) Field of Classification Search .......... 709/220, 709/224, 228; 370/463; 715/735, 736, 772
See application file for complete search history.

(56) References Cited

U.S. PATENT DOCUMENTS 4,953,159 A    8/1990  Hayden et al.
5,353,399 A *  10/1994 Kuwamoto et al. ........... 715/736
5,471,399 A    11/1995 Tanaka et al.
5,630,081 A    5/1997  Rybicki et al.
5,751,965 A *  5/1998  Mayo et al. ................... 709/224
5,758,070 A    5/1998  Lawrence
5,764,913 A *  6/1998  Jancke et al. ................. 709/224

(Continued)

FOREIGN PATENT DOCUMENTS
CN    101292239    10/2008
(Continued)

OTHER PUBLICATIONS

Newton, Harry. "Newton's Telecom Dictionary" Feb. 2006, CMP Books, 22nd ed., pp. 491, 502, and 891.*

(Continued)

*Primary Examiner* — Tonia L Dollinger
*Assistant Examiner* — Daniel C Murray
(74) *Attorney, Agent, or Firm* — Wolfe-SBMC

(57) ABSTRACT

A method and user interface for informing a user of the status of a network connection are provided. Conventionally, the "connected" icon in the system tray only informs the user that the computer is linked to a network medium, such as an Ethernet or wireless access point. This icon does not indicate whether a routable IP address has been obtained. In this invention, an icon is used to inform the user that the network connection is disabled, connecting, connected (routable IP address obtained), or in a warning state. The warning state indicates that a non-routable IP address (e.g. autonet address) has been obtained, which will likely be unsatisfactory to the user. However, when connected to an 802.11 ad-hoc network, or when IP status checking is disabled, a non-routable IP address is deemed acceptable, and thus the "connected" icon is displayed.

16 Claims, 13 Drawing Sheets

U.S. PATENT DOCUMENTS

| | | | |
|---|---|---|---|
| 5,794,206 A | | 8/1998 | Wilkinson et al. |
| 5,841,981 A | | 11/1998 | Kondo |
| 5,847,981 A | | 12/1998 | Kondo |
| 6,040,834 A | | 3/2000 | Jain et al. |
| 6,112,015 A | * | 8/2000 | Planas et al. .................. 709/223 |
| 6,125,369 A | | 9/2000 | Wu et al. |
| 6,128,601 A | | 10/2000 | Van Horne et al. |
| 6,157,965 A | | 12/2000 | Mohammed et al. |
| 6,182,225 B1 | | 1/2001 | Hagiuda et al. |
| 6,229,538 B1 | * | 5/2001 | McIntyre et al. ............. 715/734 |
| 6,333,739 B1 | | 12/2001 | Koyama et al. |
| 6,337,699 B1 | * | 1/2002 | Nielsen .......................... 715/837 |
| 6,362,841 B1 | | 3/2002 | Nykanen |
| 6,456,306 B1 | * | 9/2002 | Chin et al. .................... 715/810 |
| 6,463,457 B1 | | 10/2002 | Armentrout et al. |
| 6,463,468 B1 | | 10/2002 | Buch et al. |
| 6,496,209 B2 | | 12/2002 | Horii |
| 6,546,263 B1 | | 4/2003 | Petty et al. |
| 6,563,914 B2 | | 5/2003 | Sammon et al. |
| 6,600,499 B1 | | 7/2003 | MacPhail |
| 6,628,965 B1 | | 9/2003 | LaRosa et al. |
| 6,642,943 B1 | | 11/2003 | Machida |
| 6,691,256 B1 | * | 2/2004 | Cook et al. ...................... 714/43 |
| 6,697,354 B1 | * | 2/2004 | Borella et al. ................. 370/352 |
| 6,738,809 B1 | * | 5/2004 | Brisebois et al. ............. 709/224 |
| 6,836,483 B1 | | 12/2004 | Lee |
| 6,885,387 B1 | * | 4/2005 | Machida ........................ 715/736 |
| 6,957,390 B2 | | 10/2005 | Tamir et al. |
| 7,051,087 B1 | | 5/2006 | Bahl et al. |
| 7,120,129 B2 | | 10/2006 | Ayyagari et al. |
| 7,123,608 B1 | * | 10/2006 | Scott et al. .................... 370/353 |
| 7,197,561 B1 | * | 3/2007 | Lovy et al. .................... 709/224 |
| 7,280,648 B2 | | 10/2007 | Matsunaga et al. |
| 7,287,252 B2 | * | 10/2007 | Bussiere et al. .............. 717/176 |
| 7,313,612 B1 | * | 12/2007 | Kakimoto ...................... 709/223 |
| 7,444,394 B2 | * | 10/2008 | Igarashi et al. ............... 709/224 |
| 7,483,984 B1 | | 1/2009 | Jonker et al. |
| 7,631,270 B2 | * | 12/2009 | Cunningham et al. ........ 715/772 |
| 7,693,042 B1 | * | 4/2010 | Wei ................................ 370/216 |
| 7,876,775 B2 | * | 1/2011 | Jones et al. .................... 370/463 |
| 7,954,010 B2 | * | 5/2011 | Beattie et al. .................... 714/43 |
| 2002/0078085 A1 | * | 6/2002 | Kikuchi ...................... 707/501.1 |
| 2002/0087710 A1 | | 7/2002 | Aiken et al. |
| 2002/0140725 A1 | * | 10/2002 | Horii .............................. 345/736 |
| 2003/0065753 A1 | * | 4/2003 | Taninaka et al. .............. 709/220 |
| 2003/0069954 A1 | * | 4/2003 | Ma et al. ........................ 709/223 |
| 2003/0158932 A1 | * | 8/2003 | Machida et al. .............. 709/224 |
| 2003/0232598 A1 | | 12/2003 | Aljadeff et al. |
| 2004/0049586 A1 | * | 3/2004 | Ocepek et al. ................. 709/229 |
| 2004/0061723 A1 | * | 4/2004 | Tai et al. ........................ 345/779 |
| 2004/0221309 A1 | | 11/2004 | Zaner et al. |
| 2004/0255192 A1 | * | 12/2004 | Watanabe et al. ............... 714/25 |
| 2005/0050196 A1 | * | 3/2005 | Aita et al. ...................... 709/224 |
| 2005/0081156 A1 | * | 4/2005 | Clark et al. .................... 715/736 |
| 2005/0081157 A1 | * | 4/2005 | Clark et al. .................... 715/736 |
| 2005/0099962 A1 | | 5/2005 | Matsuda |
| 2005/0132360 A1 | * | 6/2005 | Chu et al. ...................... 717/177 |
| 2005/0238046 A1 | * | 10/2005 | Hassan et al. ................. 370/465 |
| 2006/0026289 A1 | | 2/2006 | Lyndersay et al. |
| 2006/0053389 A1 | | 3/2006 | Michelman |
| 2006/0168530 A1 | * | 7/2006 | Muller et al. ................. 715/751 |
| 2006/0218257 A1 | * | 9/2006 | Kaibe ............................ 709/220 |
| 2007/0067734 A1 | | 3/2007 | Cunningham et al. |
| 2008/0040472 A1 | * | 2/2008 | Kato et al. ..................... 709/224 |
| 2008/0046973 A1 | * | 2/2008 | Jorgensen .......................... 726/4 |
| 2008/0134046 A1 | * | 6/2008 | Gray et al. ..................... 715/736 |
| 2009/0055517 A1 | * | 2/2009 | Kao ............................... 709/221 |
| 2010/0125663 A1 | * | 5/2010 | Donovan et al. .............. 709/224 |

FOREIGN PATENT DOCUMENTS

| | | |
|---|---|---|
| EP | 0767565 | 4/1997 |
| EP | 1934816 | 6/2008 |
| PH | 86682 | 9/2006 |
| TH | 86682 | 9/2007 |
| TW | 200813803 | 3/2008 |
| WO | WO-2007035426 | 3/2007 |

OTHER PUBLICATIONS

The Cable Guy, "Wireless LAN Enhancements in Windows XP Service Pack 2," Microsoft Corporation, Aug. 1, 2004, http://web.archive.org.web/20040811091919/http://www.microsoft.com/technet/community/columns/cableguy/cg0804.mspx.

"Final Office Action", U.S. Appl. No. 11/473,761, (Apr. 1, 2009), 14 pages.

"Foreign Notice of Allowance", Chinese Application No. 200680039258.6, (May 26, 2010), 4 pages.

"Foreign Notice of Allowance", Russian Application No. 2008110077, (Dec. 9, 2010), 17 pages.

"Foreign Notice of Allowance", Russian Application No. 2008110077, (Dec. 9, 2010), 25 pages.

"Foreign Office Action", Chilean Application No. 2441-2006, (Nov. 28, 2008), 7 pages.

"Foreign Office Action", Chilean Application No. 2441-2006, (Sep. 10, 2009), 9 pages.

"Foreign Office Action", Chinese Application No. 200680039258.6, (Jun. 26, 2009), 15 pages.

"Foreign Office Action", Chinese Application No. 200680039258.6, (Dec. 18, 2009), 12 pages.

"Foreign Office Action", Japanese Application No. 2008-531330, (Sep. 29, 2011), 4 pages.

"Foreign Office Action", Mexican Application No. MX/a/2008/003408, (Jul. 13, 2010), 3 pages.

"Intel(R) PRO/Wireless 2915ABG Network Connection User Guide", available at <http://download.intel.com/support/wireless/wlan/pro2200bg/sb/2915abg_ug.pdf>,(Jun. 2005), 124 pages.

"International Search Report and Written Opinion", Application No. PCT/US2006/035881, (Feb. 20, 2007), 10 pages.

"Microsoft WIndows XP", *Screen Printout*, cited by examiner U.S. Appl. No. 11/473,761, (2002), 6 pages.

"Non Final Office Action", U.S. Appl. No. 11/473,761, (Sep. 29, 2008), 13 pages.

"Notice of Allowance", U.S. Appl. No. 11/473,761, (Sep. 11, 2009), 11 pages.

"Users Manual for the NETGEAR Dual Band Wireless PC Card 32-bit CardBus WAG511", 202-10041-01, Version v2.0, available at <http://www.netgear.com.cn/support/downloads/adapter/wag511_rel3_manual.pdf>,(Sep. 2004), 105 pages.

"Wikipedia, "Windows XP"", http://en.wikipedia.org/wiki/Windows_XP, cited by examiner in U.S. Appl. No. 11/473,761, (Mar. 27, 2009) 1-48.

* cited by examiner

| System tray Icon modes | Bitmaps Wired | Wireless |
|---|---|---|
| Not connected |  |  |
| Connecting | <br>(this icon has three states, and the "ball" moves from left to right and back) | <br>(this icon has three states, and the "ball" moves from left to right and back) |
| Warning icon |  |  |
| Connected icon |  |  |
FIGURE 8

Network States

Network Connection Folder & Main Wireless UI

This is the text shown in the Network Connections folder and the Main Wireless UI (View Available Networks). These generally reflect the sub-states (the icons represent the states) Where relevant, states above override states below.

- Device States: Disabled | Cable unplugged/Not connected | Enabled
- Authentication States: Validating identity | Authenticating | Authentication Succeeded | Authentication Failed
- IP states: Attempting to acquire network address | Invalid network address assigned | Connected

System Tray Icon

These are the icons shown in the system tray during the states above.
These map directly to the main states.
The tool-tips are the same as what is shown in the network connections folder. As before, icons above override icons below.

- Device States: No icon | Not connected icon | Connected icon
- Authentication States: "Connecting..." icon | Connected icon | Warning icon
- IP states: "Connecting..." icon | Warning icon | Connected icon

Figure 9

SYSTEM, METHOD AND USER INTERFACE FOR NETWORK STATUS REPORTING

This application claims priority to U.S. Provisional Application No. 60/592,526 filed Aug. 2, 2004.

FIELD OF THE INVENTION

This invention pertains generally to the field of computer networks and more particularly to a mechanism for reporting the status of a computer network connection to a user.

BACKGROUND OF THE INVENTION

A fairly common problem when using a network is to experience a problem getting to a network resource because the computer did not obtain IP address, or timed out getting an IP address and assigned an "automatic private IP address." Conventionally, the status of the IP address is not used to determine whether the computer is "connected" when the system (as opposed to an application) reports connectivity. Currently, connectivity is determined by whether the interface (the network device) has "media" connected to it, which in wired-Ethernet terms means that a cable is plugged in, or in wireless terms means that the device has "associated" with the access point. These are literally the first steps in a several step process leading to a state where a user can actually make use of the network. Despite this, as soon as the media connect state has been achieved, a user is informed that the computer is "Connected."

This mismatch between the system's notion of "connected" and the user's notion of "connected" is the cause of a number of problems. The difficulties include the fact that some IP addresses are better than others—an address assigned by a DHCP server is far more likely to allow access to the resources the user cares about that one assigned by the computer itself in the absence of a DHCP server (a non-routable IP address such as a link-local IPv4 address). However, the link-local address is itself not necessarily a "bad" thing. There are significant complexities that make it difficult to determine when a particular IP address is good or not. Accordingly, there is a need to provide more robust reporting of network connection states to a user.

In view of the foregoing, a system, methods, and user interface for reporting the status of a network connection are provided. In an embodiment of this invention, an icon is used to inform the user that the network connection is not connected, connecting, connected (routable IP address obtained), or in a warning state. The warning state indicates that a non-routable IP address (e.g. autonet address) has been obtained, which will likely be unsatisfactory to the user. However, when connected to an 802.11 ad-hoc network, or when IP status checking is disabled (by the user or administrator), a non-routable IP address is deemed acceptable, and thus the "connected" icon is displayed.

One embodiment of the invention is directed at a method of informing the user of a network connection status. The method comprises attempting to join a network; detecting a state of the attempt; if the computer system is not connected to a network medium, determining the attempt to be in a first state; if the computer system has acquired a routable network address, determining the state of the attempt to be in a second state; if the computer system has acquired a non-routable network address, determining the state of the attempt to be in a third state; if the attempt is not in one of the first, second and third states, determining the state of the attempt to be in a fourth state; and informing the user of the state of the attempt. Attempting to join a network further comprises undergoing an authentication procedure, and if the authentication procedure fails, determining the state of the attempt to be in the third state. In keeping with features of the invention, the first state is a disconnected state, the second state is a connected state, the third state is a warning state, and the fourth state is a connecting state.

When the state of the attempt is in the warning state, one embodiment of the invention informs the user how to repair a problem causing the attempt to be in the warning start. The network may be a wired network, wherein the computer system is connected to a network medium if a wired physical connection to the network is detected. The network may be a wireless network, wherein the computer system is connected to a network medium if the computer system has detected a wireless network. In one embodiment, the network is a TCP/IP network and the network address is an IPv4 address. When one of IP status checking is disabled on the computer system, or the type of 802.11 network is determined to be an "ad-hoc" network, the state of the attempt is determined to be in the second state if the computer system is connected to a network medium.

A user may be informed of the state by displaying an icon on a desktop of an operating system. The icon is different for each state. A detected change in the state of the attempt is reported to the user by changing the icon.

Another embodiment of the invention is directed at a user interface for informing a user of a computer system of a status of a network connection. The user interface includes a first icon that is displayed to signify that the network connection is in a first state, wherein the first state is a state of not being connected to a network medium; a second icon that is displayed to signify that the network connection is in a second state, wherein the second state is a state of having acquired a routable IP address; a third icon that is displayed to signify that the network connection is in a third state, wherein the third state is a state of having acquired a non-routable IP address; and a fourth icon that is displayed to signify that the network connection is in a fourth state, wherein the fourth state is a state of attempting to connecting to a network. The icon may be displayed in the notification area (sometimes referred to as the "system tray"). Clicking the icon launches a dialog box.

Additional features and advantages of the invention are made apparent from the following detailed description of illustrative embodiments that proceeds with reference to the accompanying figures.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 8 illustrates the icons associated with the network connectivity segmentation performed by the present invention;

FIG. 9 is a diagram illustrating the segmentation of network connectivity as it pertains to the user interface of the present invention;

DETAILED DESCRIPTION OF THE INVENTION

Figure 1A:
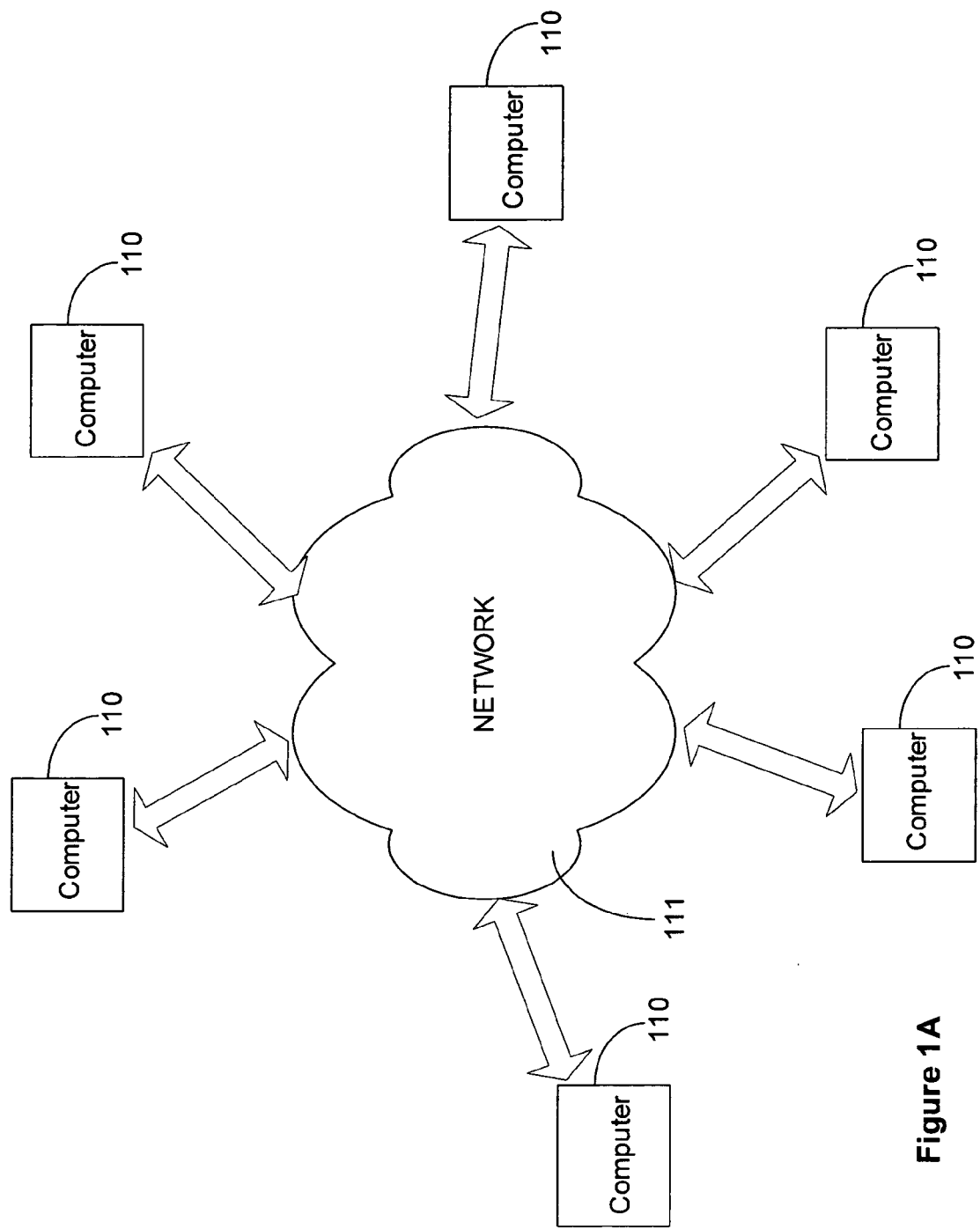
FIG. 1A is a schematic generally illustrating an exemplary network environment across which the present invention operates.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that the various acts and operations described hereinafter may also be implemented in hardware.

An example of a networked environment in which the invention may be used will now be described with reference to FIG. 1A. The example network includes several computers 110 communicating with one another over a network 111, represented by a cloud. Network 111 may include many well-known components, such as routers, gateways, hubs, etc. and allows the computers 110 to communicate via wired and/or wireless media. When interacting with one another over the network 111, one or more of the computers may act as clients, network servers, or peers with respect to other computers. Accordingly, the various embodiments of the invention may be practiced on clients, network servers, peers, or combinations thereof, even though specific examples contained herein do not refer to all of these types of computers.

Figure 1B:
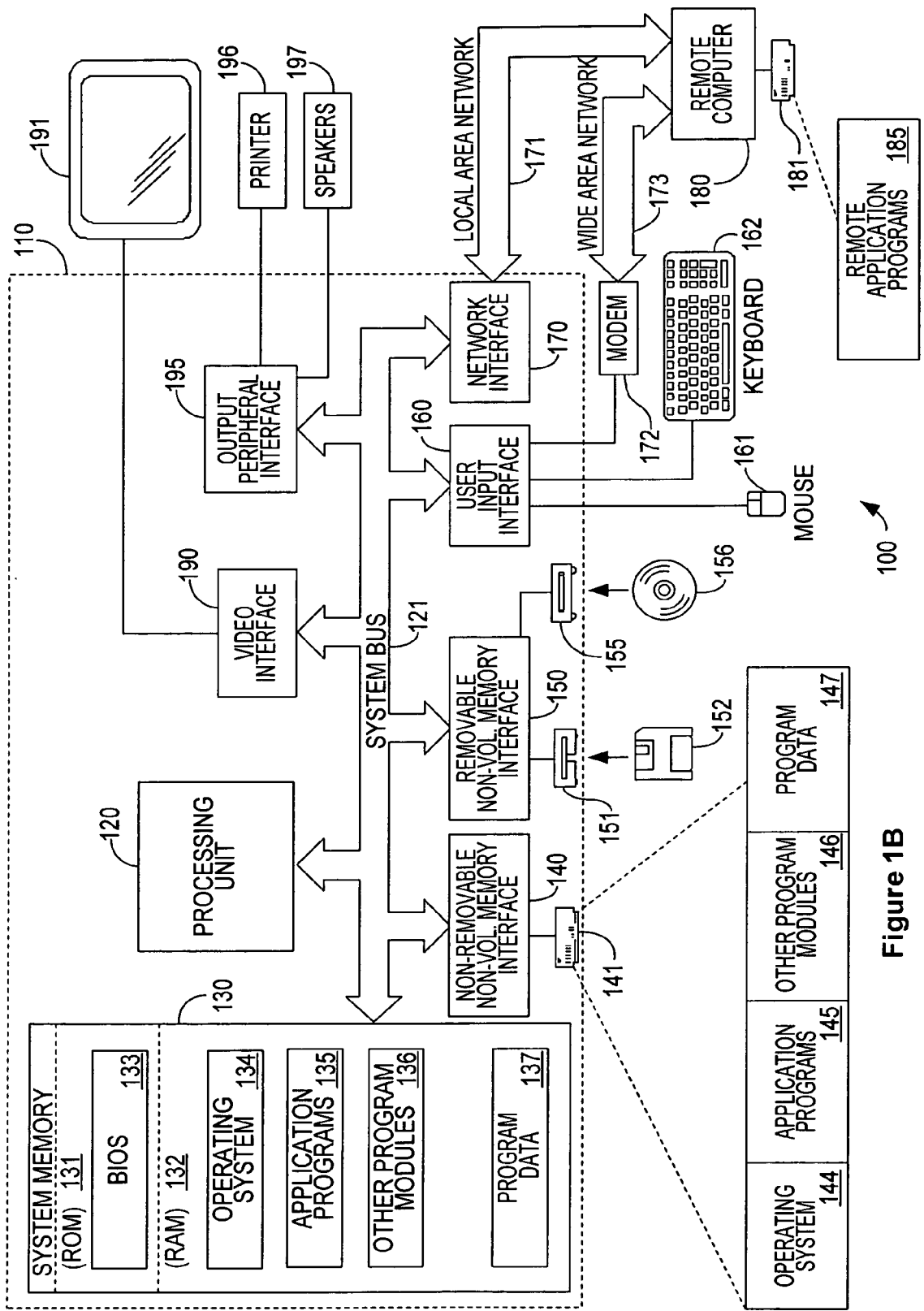
FIG. 1B is a block diagram generally illustrating an exemplary computer system on which the present invention resides.

FIG. 1B illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary computing environment 100.

The invention is operational with numerous other general-purpose or special-purpose computing system environments or configurations. Examples of well known computing systems, environments, and configurations that may be suitable for use with the invention include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer-storage media including memory-storage devices.

With reference to FIG. 1B an exemplary system for implementing the invention includes a general-purpose computing device in the form of a computer 110, which may act as a client, network server, quarantine server, or peer within the context of the invention. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture bus, Micro Channel Architecture bus, Enhanced ISA bus, Video Electronics Standards Associate local bus, and Peripheral Component Interconnect bus, also known as Mezzanine bus.

The computer 110 typically includes a variety of computer-readable media. Computer-readable media can be any available media that can be accessed by the computer 110 and include both volatile and nonvolatile media, removable and non-removable media. By way of example, and not limitation, computer-readable media may include computer storage media. Computer storage media include both volatile and nonvolatile, removable and non-removable media implemented in any method or technology for the storage of information such as computer-readable instructions, data structures, program modules, or other data. Computer storage media include, but are not limited to, RAM, ROM, EEPROM, flash memory or other memory technology, CD-ROM, digital versatile disks or other optical disk storage, magnetic cassettes, magnetic tape, magnetic disk storage or other magnetic storage devices, or any other medium which can be used to store the desired information and which can be accessed by the computer 110. Communication media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communication media include wired media such as a wired network or direct-wired connection and wireless media such as acoustic, RF, infrared, and other wireless media. Combinations of the any of the above should also be included within the scope of computer-readable media.

The system memory 130 includes computer storage media in the form of volatile and nonvolatile memory such as read only memory (ROM) 131 and random access memory (RAM) 132. A basic input/output system 133 (BIOS), containing the basic routines that help to transfer information between elements within the computer 110, such as during start-up, is typically stored in ROM 131. RAM 132 typically contains data and program modules that are immediately accessible to or presently being operated on by the processing unit 120. By way of example, and not limitation, FIG. 1B illustrates an operating system 134, application programs 135, other program modules 136, and program data 137.

The computer 110 may also include other removable/non-removable, volatile/nonvolatile computer storage media. By way of example only, FIG. 1B illustrates a hard disk drive 141 that reads from or writes to non-removable, nonvolatile, magnetic media, a magnetic disk drive 151 that reads from or writes to a removable, nonvolatile, magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary computing environment 100 include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as the interface 140, and the magnetic disk drive 151 and the optical disk drive 155 are typically connected to the system bus 121 by a removable memory interface, such as the interface 150.

The drives and their associated computer storage media discussed above and illustrated in FIG. 1B provide storage of computer-readable instructions, data structures, program modules, and other data for the computer 110. In FIG. 1B, for example, the hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers to illustrate that, at a minimum, they are different copies.

A user may enter commands and information into the computer 110 through input devices such as a keyboard 162 and a pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus. A monitor 191 or other type of display device is also connected to the system bus 121 via an interface, such as a video interface 190. In addition to the monitor 191, the computer 110 may also include other peripheral output devices such as speakers 197 and a printer 196 which may be connected through an output peripheral interface 195.

The computer 110 operates in a networked environment using logical connections to one or more remote computers, such as a remote computer 180. The remote computer 180 may be a personal computer, a server, a router, a network PC, a peer device, or other common network node and typically includes many or all of the elements described above relative to the personal computer 110 although only a memory storage device 181 has been illustrated in FIG. 1B. The logical connections depicted in FIG. 1B include a local area network (LAN) 171 and a wide area network (WAN) 173 but may also include other networks. Such networking environments are commonplace in offices, enterprise-wide computer networks, intranets, and the Internet. Furthermore, LAN 171 includes both wired and wireless connections.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the personal computer 110, or portions thereof, may be stored in the remote memory storage device 181. By way of example, and not limitation, FIG. 1B illustrates the remote application programs 185 as residing on the memory device 181. It will be appreciated that the network connections shown are exemplary, and other means of establishing a communications link between the computers may be used.

The invention relates to methods and user interfaces for reporting the status network connections to a user. In one embodiment of the invention, the methods and user interfaces are included in a computer operating system (OS). In an exemplary embodiment, the invention is included in the Microsoft Windows XP OS. In other embodiments, the invention is provided as a stand-alone utility that may be installed on top of an OS.

Figure 2:
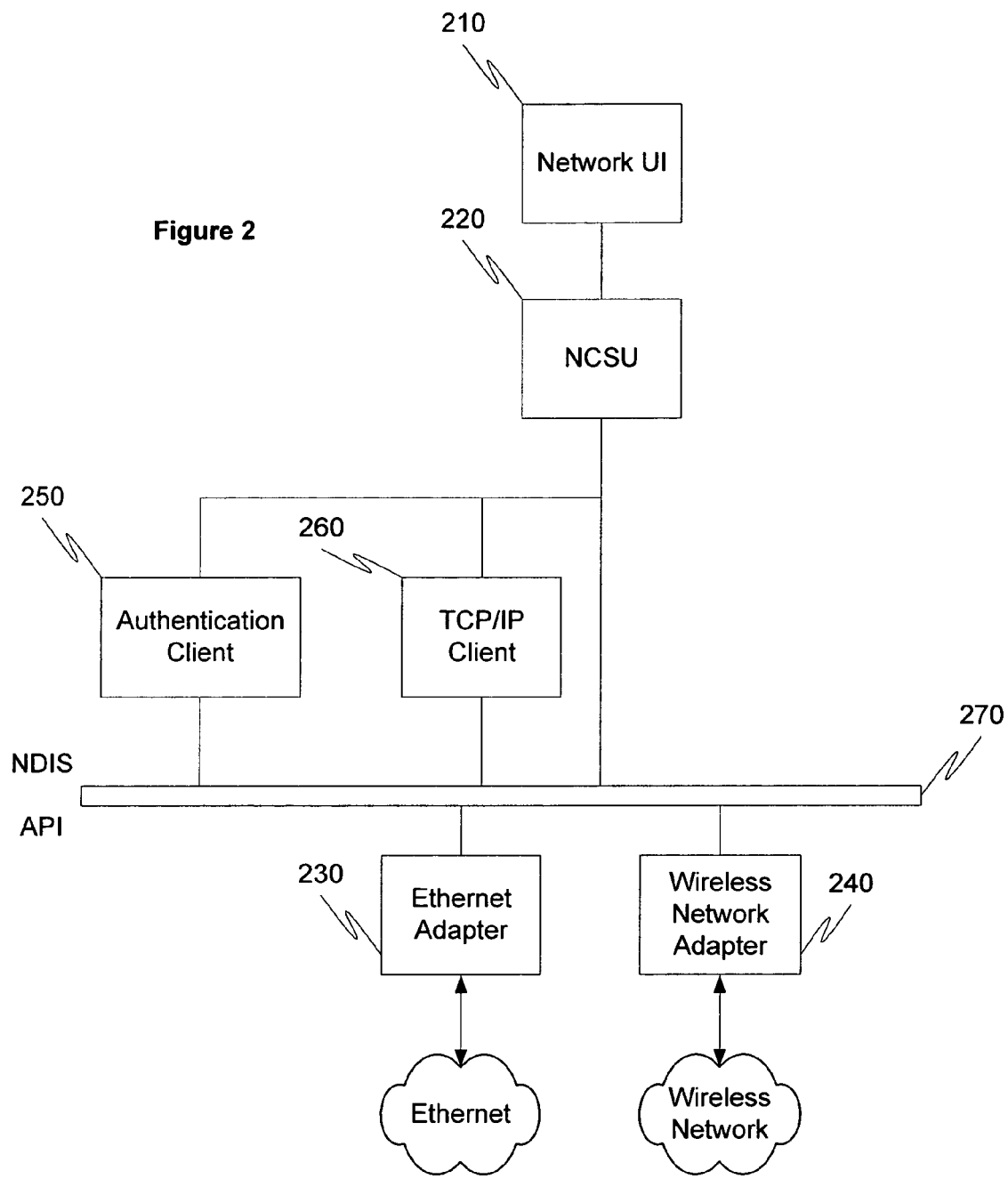
FIG. 2 is a block diagram illustrating a network status checking system of the present invention.

Through the invention, the status of a network connection is segmented into device-specific states, authentication-specific states, and internet protocol (IP)-specific states. These states are then combined, in view of the computer's network settings configuration and the network properties, to determine an overall state that is reported to the user. FIG. 2 illustrates a system diagram of an embodiment of the invention. A Networking User Interface (NUI) 210 reports the overall state of network connections to a user through notification area icons, pop-up balloons, and dialog boxes. The overall state of network connections is provides to the NUI 210 by the Network Connection State Utility (NCSU) 220. The NCSU 220 detects the device-specific, authentication-specific, and IP-specific states for each installed network adapter. By way of example, NCSU 220 uses the Microsoft Windows "SetupDi" call to enumerate the network adapters installed, and finds Ethernet network adapter 230 and wireless network adapter 240. Both Ethernet network adapter 230 and wireless adapter 240 include a Network Driver Interface Specification (NDIS) miniport driver (not shown). NCSU 220 calls NDIS API 270 to detect the device-specific states of Ethernet network adapter 230 and wireless adapter 240. NCSU 220 calls on an API provided by authentication client 250 to obtain the authentication-specific states. NCSU 220 calls on an API provided by the TCP/IP client 260 to obtain the IP-specific states. In an exemplary embodiment, the authentication client 250 is an 802.1x client and the TCP/IP client 260 is a Dynamic Host Control Protocol (DHCP) client. NCSU 220 can then determine an overall state of each network connection managed by the OS using the methods disclosed herein.

Figure 3:
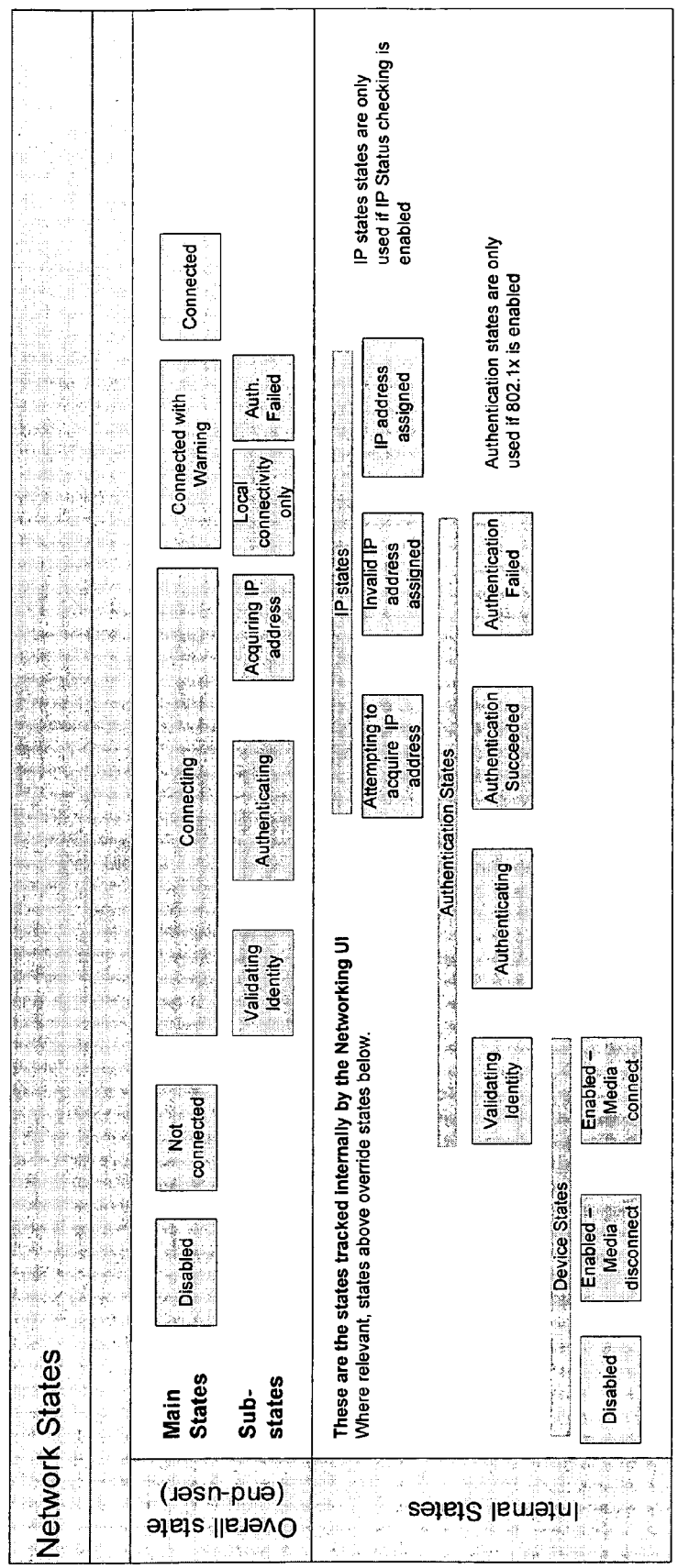
FIG. 3 is a diagram illustrating the segmentation of network connectivity, as performed by the present invention.

The network connectivity state segmentation is described with reference to FIG. 3. The device-specific states include three states: disabled, network media disconnected, and enabled. When a device (network adapter) is installed, but the driver is stopped, the device state is "Device State 0: Disabled". When the device reports no media connection, the device state is "Device State 1: Media Disconnected." For wired network connections this state is reported as: "Network cable unplugged." For wireless network connections, this state is reported as: "Not connected." When a device reports a network media connection, the device state is "Device State 2: Enabled."

The authentication-specific states include validating identity, authenticating, authentication failed, and authentication successful. These states exist only when an authentication protocol is enabled for the connection, or, in the case of wireless, enabled for the specific network being to which the supplicant is connecting. In one embodiment of the invention, the authentication protocol is the IEEE 802.1x protocol. An adapter must be in Device State 2 (Enabled) for these states to be used. When the authenticator is asking the user or computer for information, the authentication state is "Authentication State 1: Validating Identity." While the authenticator is authenticating the credentials of the user/computer, the device state is "Authentication State 2: Authenticating." If the credentials are invalid or the authentication otherwise fails, the authentication state is "Authentication State 3: Authentication Failed." In the case of wireless networks, this state is short-lived because the authenticator will terminate the connection immediately. In the case of wired networks, this state is considered an error state. When the authenticator reports that authentication was successful, the authentication state is "Authentication State 4: Authentication Successful."

Figure 4:
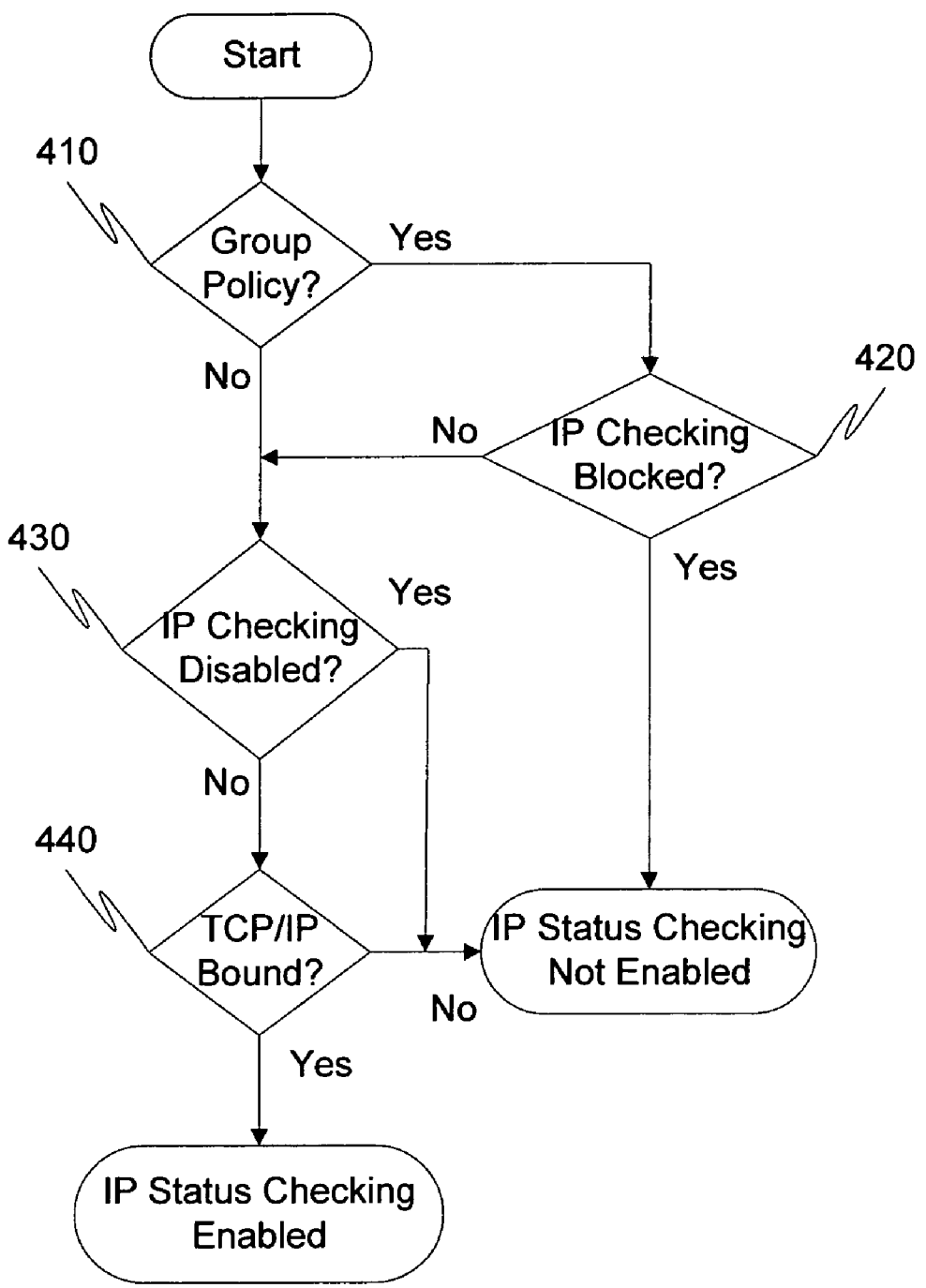
FIG. 4 is a flow diagram illustrating a method for detecting whether IP status checking is enabled, in accordance with the present invention.

The IP address-specific states include acquiring an IP address, invalid IP address assigned, and valid IP address assigned. These states exist only when IP Status Checking is enabled for an adapter. FIG. 4 illustrates a method of one embodiment of the invention for determining whether IP Status Checking is enabled for each network adapter. At step 410, it is determined whether a group policy is present. If so, it is determined whether the group policy blocks the IP status checking feature for the user or machine at step 420. If so, then IP Status Checking is not enabled. Otherwise, if no group policy is present, or if the group policy does not block IP Status Checking, then it is determined whether IP Status Checking has been manually disabled by the user through the Network UI at step 430. If so, then IP Status Checking is not enabled. Otherwise, it is determined whether that TCP/IP is installed and bound for the network adapter at step 440. If so, IP Status Checking is enabled. Otherwise, IP Status Checking is not enabled.

For the IP-specific states to be used, a network adapter must be in Device State 2 (enabled) and either (a) have 802.1x disabled or (b) be in Authentication State 4 (authentication successful). If the network adapter is attempting to acquire an IP address, the IP-specific state is "IP State 1: Attempting to acquire an IP address." In an exemplary embodiment, the network adapter includes a DHCP client that is attempting to contact a DHCP server to get an IP address. When an IP address has been acquired, if the IP address is invalid then the IP-specific state is "IP State 2: Invalid IP address assigned." When an IP address has been acquired, if the IP address is valid then the IP-specific state is "IP State 3: Valid IP Address Assigned."

An IP address may be valid or invalid depending on the network configuration settings of the computer and they type of network to which the computer is connected. If DHCP is enabled on the computer, the network adapter is in IP State 3: Valid IP Address Assigned if a routable network address has been assigned by the DHCP server. In an exemplary embodiment, the routable network address is an IPv4 address routable outside the subnet of that address. If a routable network address is not assigned, but an alternate static IP configuration is available, then the network adapter is also in IP State 3. However, if a non-routable network address is assigned, and no alternate static IP configuration exists, then the network adapter is in IP State 2: Invalid IP Address Assigned, unless the network connection is an ad-hoc wireless connection. In an exemplary embodiment, the non-routable IP address is an IPv4 link-local address that is not routable outside the subnet of the address. In a more exemplary embodiment of the invention, the IPv4 link-local address is assigned by AutoNet in the Microsoft Windows OS, and is assigned to the 169.254.0.0 network. Though, if DHCP is not enabled, then any IP address is valid, routable or not, and the network adapter is in IP State 3.

Figure 5:
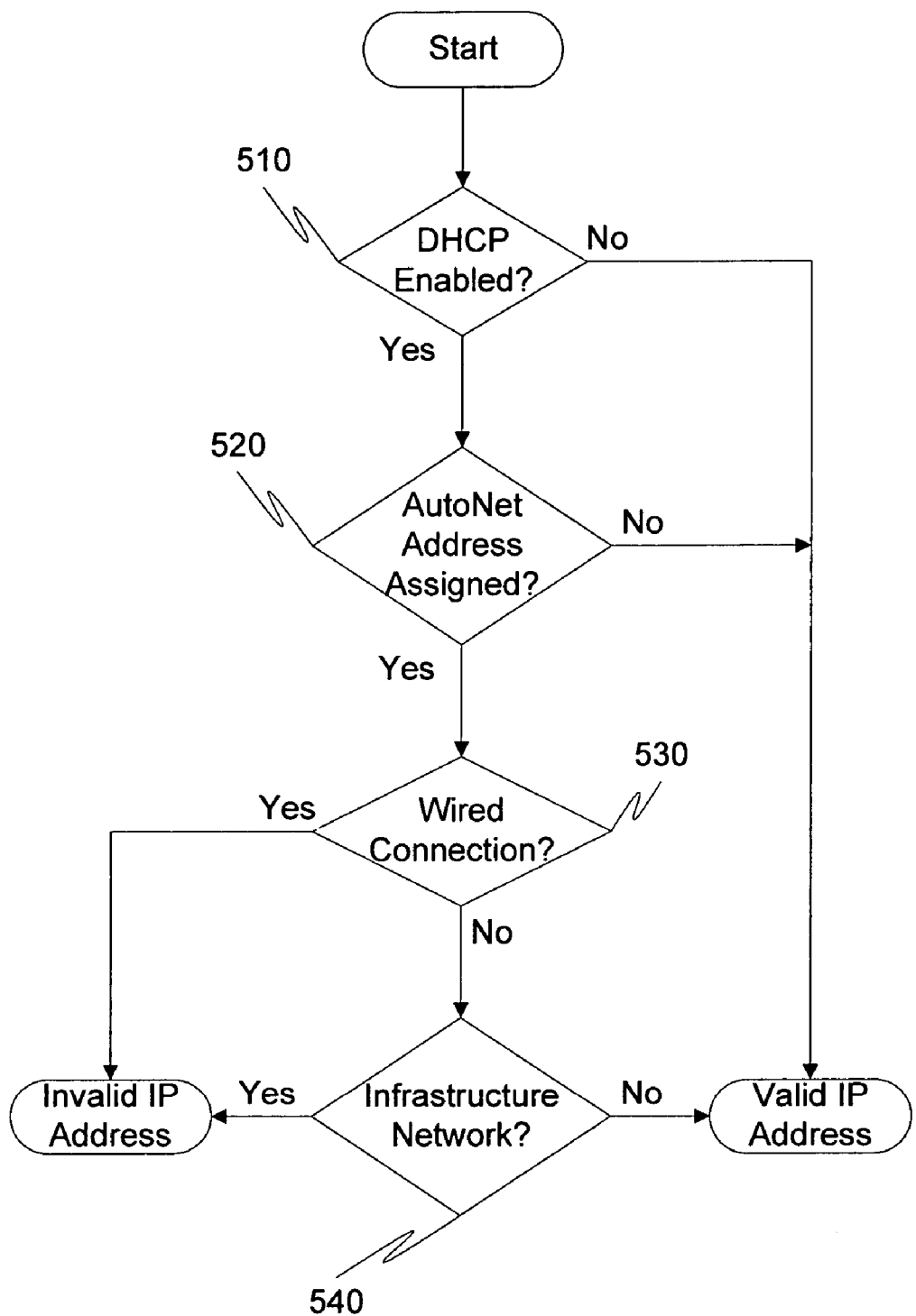
FIG. 5 is a flow diagram illustrating a method for determining whether a valid IP address was assigned, in accordance with the present invention.

A method of an embodiment of the invention for determining whether an IP address is valid is illustrated in FIG. 5. At step 510, it is determined whether DCHP is enabled for the network adapter. If not, the IP address is valid. However if DHCP is enabled, it is determined whether a non-routable IP address has been assigned at step 520. If not, then IP address is valid. But if so, it is determined whether the network connection is a wired connection at step 530. If so, then the IP address is invalid. However if the connection is wireless, it is determined whether the network adapter is connected to a wireless Infrastructure-type network at step 540. If so, then the IP address is invalid. Otherwise, the IP address is valid.

Figure 6:
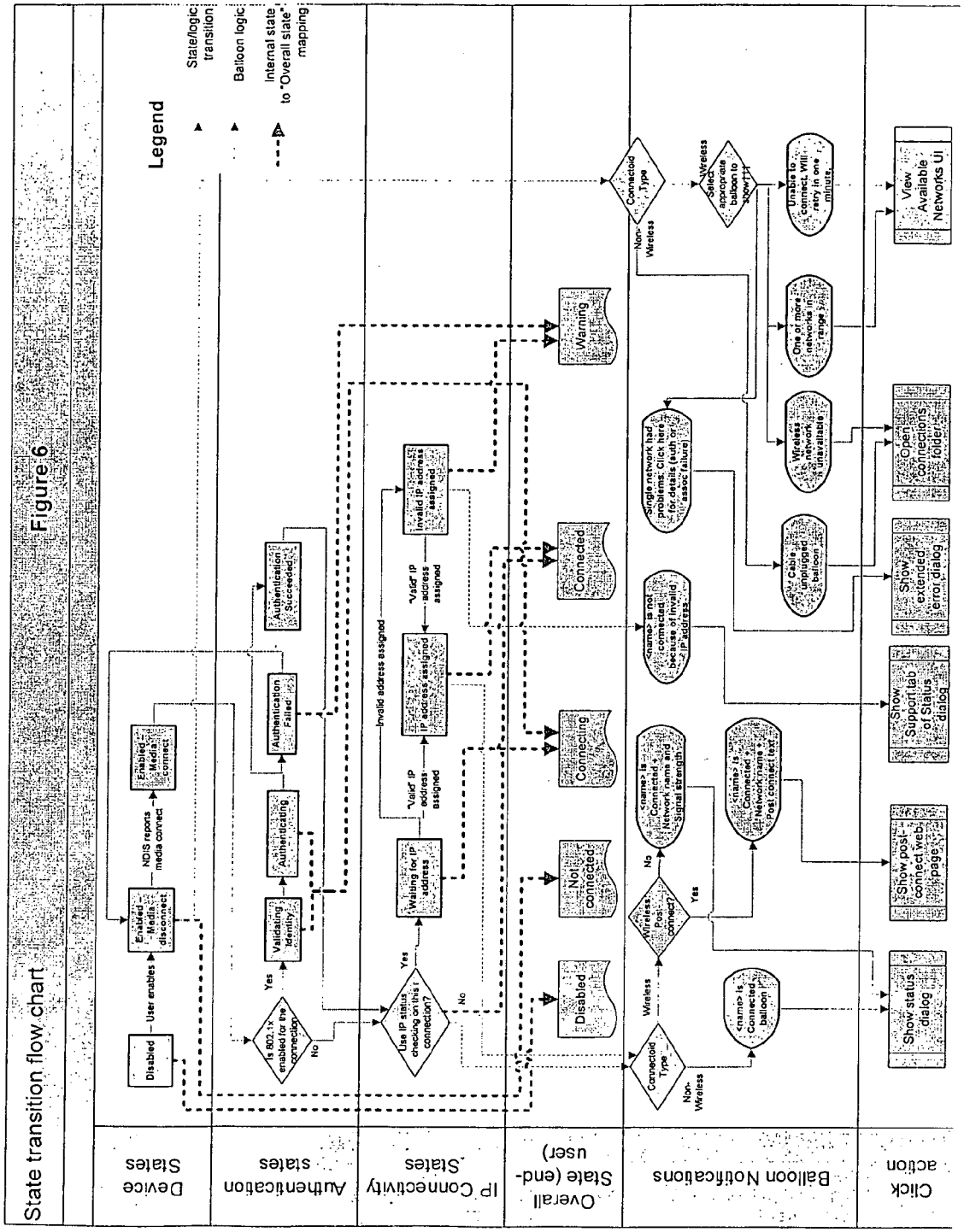
FIG. 6 is an overview flow diagram of a network status detecting method of the present invention.

FIG. 6 illustrates an overview of a method for determining the overall state of a network connection. This method is described in greater detail with reference to FIG. 7. A network connection is initially presumed to be in the "Disabled" state until the NDIS driver for the connection reports whether network media are connected to the network adapter. No icon is shown in the system tray of the OS while in the "Disabled" state. Thus, at step 710, it is determined whether network media have been found. In the case of a wired network connection, a network medium is found if a physical connection to a network (for example, an Ethernet) is detected. In the case of a wireless network, a network medium is found if a wireless network adapter is able to associate with a wireless access point or another wireless device (in the case of ad-hoc networks). If a network medium is not found for the connection, the connection is considered to be in the "Not Connected" state, and the "Not Connected" icon is displayed in the system tray. If a network medium is found, the connection is considered to be in the "Connecting" state, and the "Connecting" icon is displayed in the system tray.

At step 720, it is determined whether 802.1x protocol is enabled for the connection. If not, the method proceeds to step 750. If 802.1x protocol is enabled, the credentials of the user or machine are authenticated at step 730. At step 740, it is determined whether the authentication was successful. If the authentication failed, the connection is considered to be in the "Warning" state, and the "Warning" icon is displayed in the system tray. If authentication was successful, it is determined at step 750 whether IP Status Checking is enabled, as illustrated in FIG. 4. If not, the connection is considered to be in the "Connected" state, and the "Connection" icon is displayed in the system tray. If IP status checking is enabled, an IP is acquired at step 760. At step 770, it is determined whether the assigned IP address is valid, as illustrated in FIG. 6. If not, the connection is considered to be in a "Warning" state, and the "Warning" icon is displayed is the system tray. If the IP address is valid, then the connection is considered to be in the "Connected" state, and the "Connected" icon is displayed in the system tray.

Another embodiment of the invention includes waiting for a predetermined time period before retrying to acquire an IP address, and delaying informing the user of a warning state until after retry is attempted. The DHCP client is constantly engaged in trying to contact a DHCP server during first connects, during lease renewals, on subnet changes, and so on. Much of this behavior is designed to be "behind the scenes" and does not need to be exposed to the user. The UI needs to interpret the DHCP client state in such a way that the (a) the user is aware what is going if it is relevant to their usage of the network and (b) they are told as quickly as possible what is going on.

In this embodiment, three pieces of information are made available to the UI by the DHCP client. That information includes the state of the currently assigned IP address, the current state of the DHCP client, and a RetryTime. The state of the IP address may be 1) assigned a automatic private IP address (APIPA) (e.g. a non-routable IP address such as an autonet address), which is an address that has been assigned automatically due to a failure to contact a DHCP server; 2) assigned a non-APIPA, which is a routable IP address (e.g. an address that has been assigned by a DHCP server) or an alternate static configuration; or 3) no address configured (signified as an IPv4 address of 0.0.0.0).

The current state of the DHCP client, with respect to whether or not is actively attempting to get an IP address or not can be of 1) Done, signifying that the client is not actively doing anything to attempt to change the current IP address (attempting to get a new address, for example); 2) Acquiring, signifying that the DHCP client is getting a new IP address; and 3) Renewing, signifying that the DHCP client is renewing the lease on an existing IP address.

Typically, the combination of the current IP address state and the DHCP client state are enough to figure out what to show the user. For example, if the IP address is zero, and the status is "acquiring"—that means that the UI should show "acquiring". However, if the IP address is zero, and the Status is "done", that is considered a failure state. In one embodiment of the invention, the DHCP client sometimes "sleeps" for varying periods of time and then wakes up and tries again. For example, if it fails to find a DHCP server, it will assign an APIPA address and then go to sleep for 2 seconds before trying again. Failing again, it will try again after 5 minutes. In some embodiments, there are delays of 10 seconds or 1 second between retry periods. In order to fulfill the goals of being both timely and relevant, the present invention is aware of these time periods in order to decide how to treat them.

An embodiment of the invention accomplishes this by further providing an additional piece of information called RetryTime indicating to the UI how long the DHCP client intends to wait before trying again. Depending on how long this delay is, the UI may "gloss" over the wait period by staying in the acquiring state, or choose to indicate an error. Accordingly, spurious errors are not shown are not shown to the user. Thus, if the DHCP client has acquired an APIPA or zero IP address, an embodiment of the invention delays informing the user of the warning state until after the RetryTime has elapsed and the retry is unsuccessful. In one embodiment of the invention, the period for RetryTime is 2 seconds, though it will be appreciated by those skilled in the art that period could be chosen.

Figure 7:
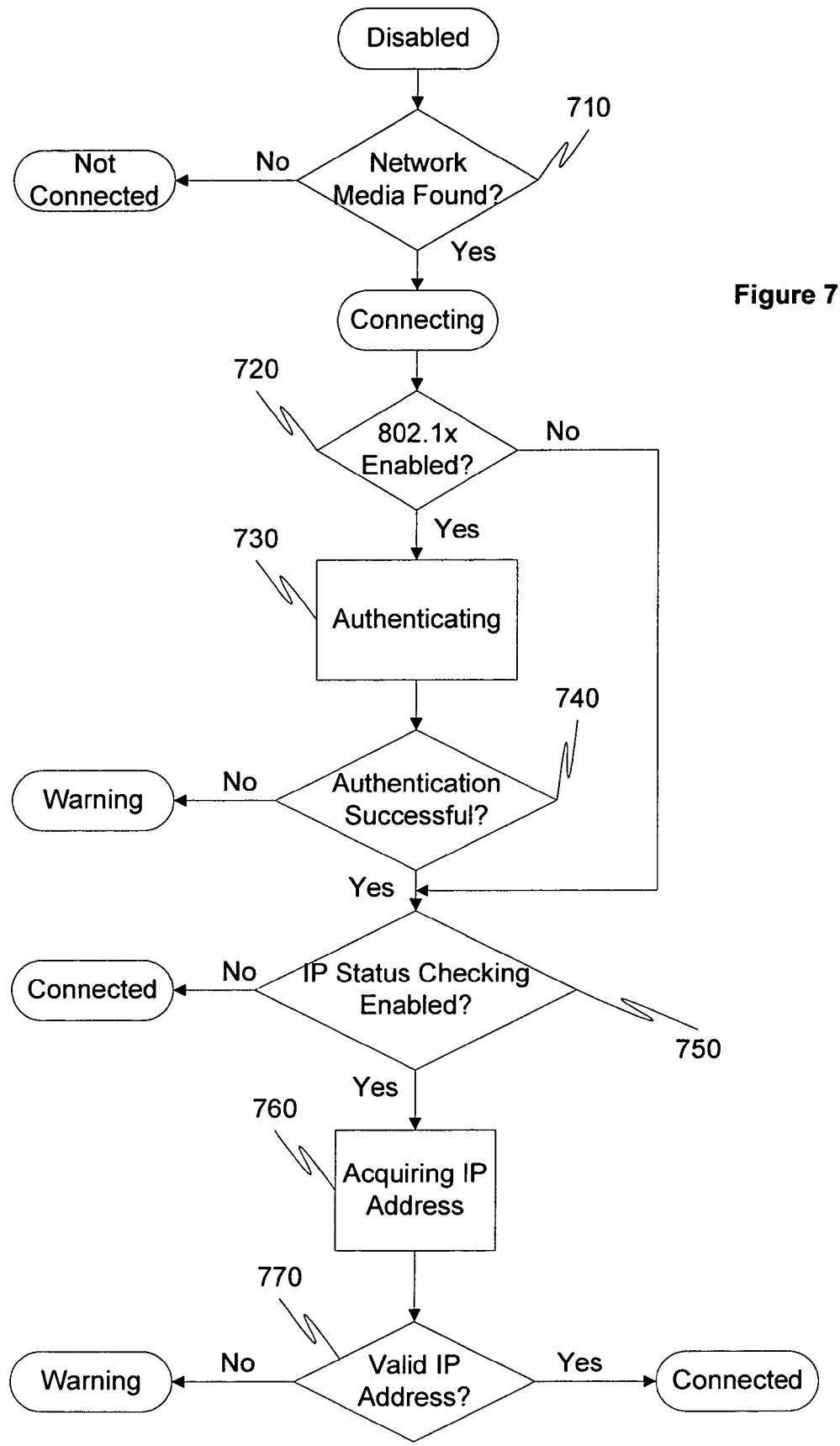
FIG. 7 is a detailed flow diagram of a network status detecting method of the present invention.

A UI of an embodiment of the invention will now be described in greater detail. FIG. 8 illustrates the notification area icons and which overall states they report to the user. An icon is shown for each state, and for each type of connection, wired or wireless. FIG. 9 further illustrates when these icons are displayed. Not Connected/Network Cable Unplugged Icon: this icon is used when the device reports media disconnected. Connecting Icon: this icon is displayed once the connection reaches the "Connecting" state, as shown in FIG. 7, and is displayed until the connection enters another state. Notably, this icon is displayed while the authentication client prompts for credentials. Warning Icon: this icon is displayed when authentication has failed or when an invalid IP address has been assigned. Connected Icon: this icon is used when the connection reaches the "Connected" state, as shown in FIG. 7.

FIG. 9 further illustrates the status labels associate with each network connection as shown in the Network Connections folder of the OS, as well as the Wireless Networks UI.

The balloon notifications of the UI of the invention are discussed with reference to FIG. 6. Once the connection reaches the "Connected" state, the Connected Balloon appears with the Connected Icon. If the connection is wired then the balloon states that the named connection is connected. If the connection is wireless with no post-connection procedure enabled, then the balloon states that the named connection is connected, along with the name of the network and signal strength. Clicking on these balloons produces a status dialog box, discussed later. If the connection is wireless with a post-connection procedure enabled, then the balloon states that the named connection is connected, along with the name of the network, signal strength, and post-connection procedure text. Clicking on this balloon produces a post-connection procedure web page. However, once the connection reaches the "Warning" state due to an invalid IP address, the Warning Balloon is displayed along with the Warning Icon. The Warning Balloon states that the named connection is not connected due to an invalid IP address, and clicking on this balloon produces a Support section of status dialog box where the user can attempt to remedy the problem.

When the connection reaches the "Not Connected" state, if the connection is a wired connection a balloon is displayed stating that the cable is unplugged. If the connection is a wireless connection, the displayed balloon depends upon whether there are visible networks, whether there are visible networks on that are on a list of preferred networks, and whether there are manual networks. If the device tried to connect to all the networks in range, but failed, there are no more networks to try (i.e. none of them are manual), and there is only one network in range, then the balloon states that the device was unable to connect to the found wireless network but it will keep trying to connect. Clicking on this balloon launches an extended error dialog. If the device tried to connect to all the networks in range, but failed, there are no more networks to try (i.e. none of them are manual), and there is more than one network in range, then the balloon states that the device was unable to connect to a wireless network and that the device could not connect to any of the preferred wireless networks but it will keep trying to connect. When clicked this balloon launches the View Available Networks (VAN) UI.

If the device tried to connect to all the networks that it could, but failed, there are more networks to try (but they aren't in the preferred list), and none of them are manual, then the balloon states that the device is unable to connect to a preferred wireless network but it will keep trying to connect. When clicked this balloon launches the VAN UI. If there are networks in range, but none of them are in the preferred list (but there are networks in the preferred list), then the balloon states that One or more wireless networks are in range of this computer. When clicked this balloon launches the VAN UI. If there are networks in range, and the preferred list is empty, then the balloon states that one or more wireless networks are in range of this computer. When clicked this balloon launches the VAN UI. If there are no visible wireless networks, then the balloon states that a wireless network is not available. When clicked this balloon opens the Network Connections folder.

Figure 10:
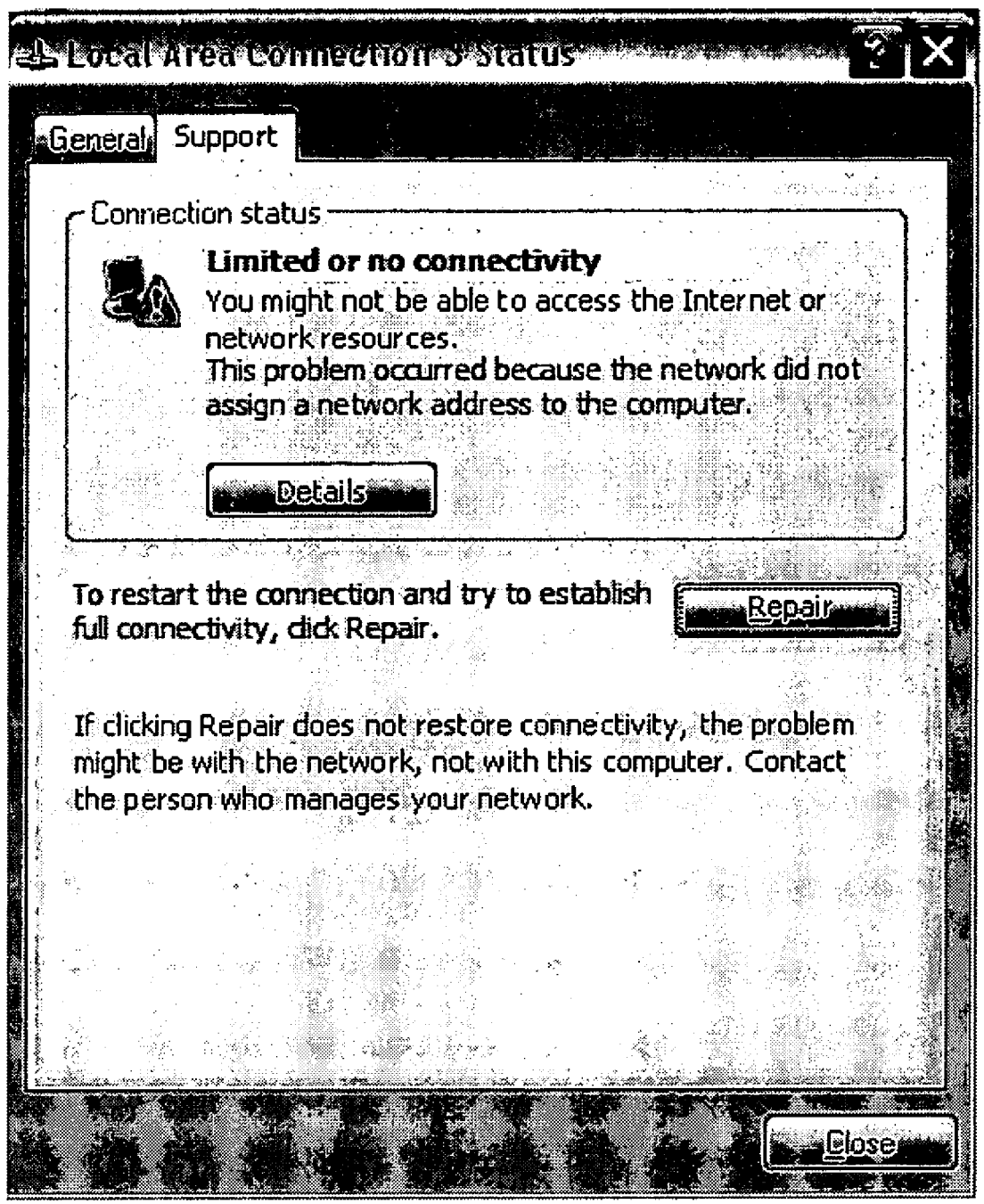
FIG. 10 is a screen shot of a status dialog box of the present invention.
Figure 11:
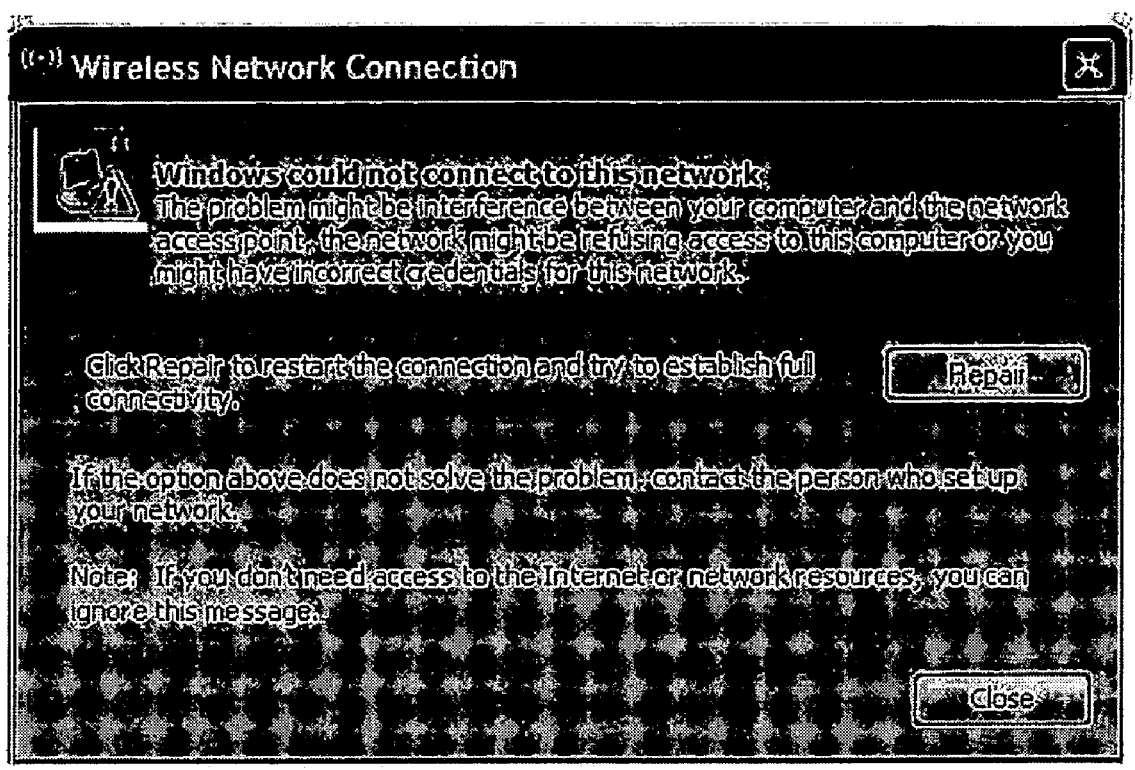
FIG. 11 is a screen shot of a support dialog box of the present invention.
Figure 12:
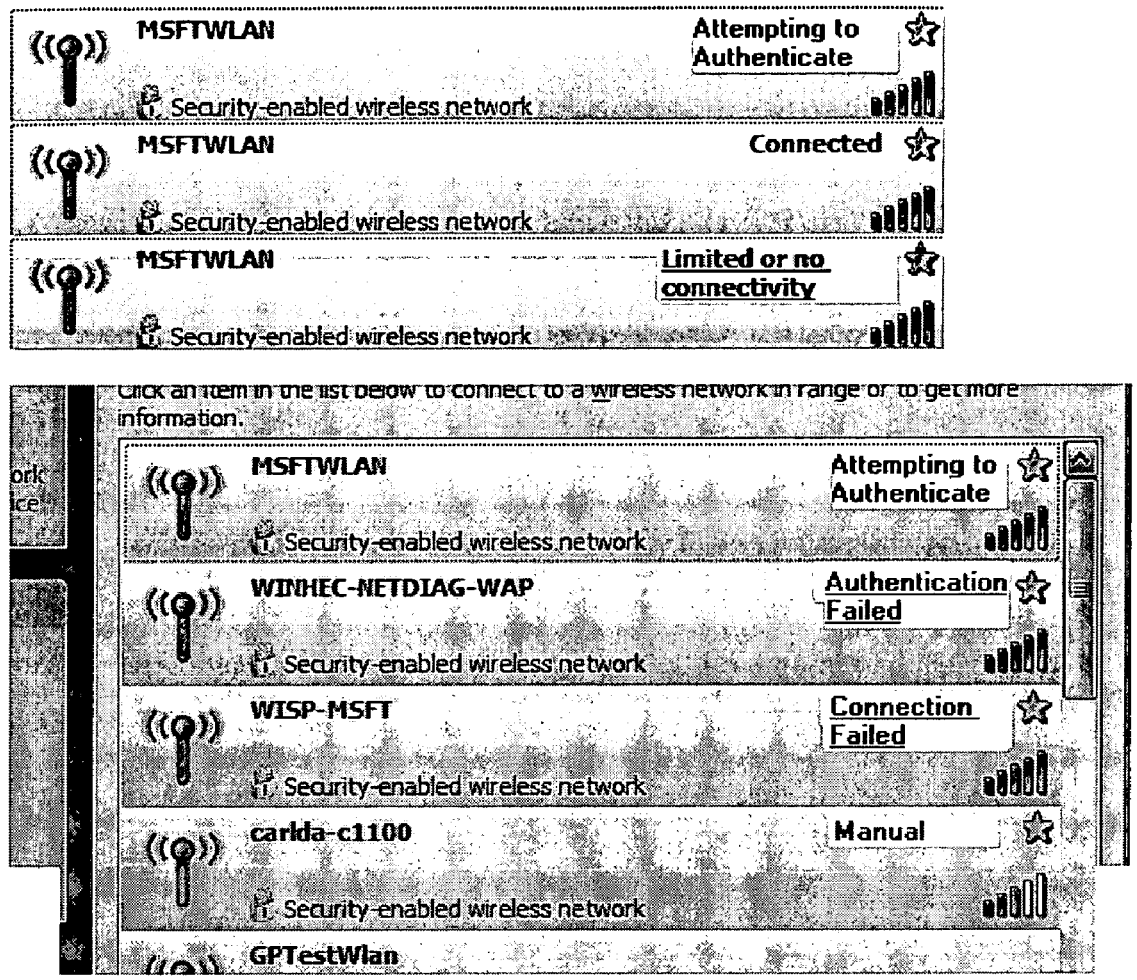
FIG. 12 is a screen shot of an extended error dialog box of the present invention.

FIGS. 10, 11, and 12 illustrate the status dialog and extended error dialog boxes of the UI of the invention. The General tab of the status dialog box in FIG. 10 includes the overall network connection status for that connection, as well as the name of the network to which the connection is made. FIG. 11 illustrates the Support tab of the status dialog box, which gives the user the opportunity to explore the details of a "Not Connected" or "Warning" state connection, as well the opportunity to repair the problem. FIG. 12 illustrates the extended error dialog box that explains to the user in more detail the cause of failed connection where the failure was to due an invalid IP address, failed authentication, or failed association with a wireless network.

FIG. 13 illustrates screenshots of a wireless UI comprised in the invention. The wireless UI displays each wireless connection along with the overall connection status and signal strength. If an invalid IP address was assigned, authentication failed, or association failed (connection failed), then the overall connection status indicates the failure and links to an extended error dialog box.

Table 1 indicates the test use for various states in the Network Connections folder and the wireless UI.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A computer readable medium other than a signal per se having a sequence of instructions which, when executed by a processor that is a functional component of a network communications device, causes the processor to execute a process for informing the user of a network connection status, the process comprising:
attempting to join a network;
determining a state of the attempt from a plurality of connection states, wherein the plurality of connection states include:
a first state configured as a disabled state that indicates the network communications device is installed but is stopped;
a second state configured as a disconnected state to indicate that the network communications device is not connected to a network medium, responsive to detecting that the network communications device is unable to establish a wired network connection or a wireless network connection;

TABLE 1

| State name | | Status in folder & in Wireless UI | Icon Tooltip |
|---|---|---|---|
| Device-specific states | Disabled | Folder:<br>Disabled<br>Main Wireless UI:<br>N/A | N/A |
| | Enabled-Media disconnected | Folder/Wired:<br>Network cable unplugged.<br>Folder/Wireless:<br>Not connected<br>Wireless UI:<br>Manual, Automatic or On demand | Wired: Network cable unplugged.<br>Wireless: Not connected. Right-click here for more options. |
| | Enabled (media connected) | Folder:<br>Enabled<br>Main Wireless UI:<br>Connected | Standard connected tool-tip (name, speed, network and signal strength) |
| Auth-specific states | Credentials required | Validating identity | Validating identity, + speed, network and signal strength |
| | Authenticating | Attempting to authenticate | Attempting to authenticate, + speed, network and signal strength |
| | Authentication failed | Authentication did not succeed | Authentication did not succeed, + speed, network and signal strength |
| | Authentication success | Connected | Standard connected tool-tip |
| IP-specific address states | Attempting to acquire an IP address | Acquiring network address | Acquiring a network address, + speed, network and signal strength |
| | Autonet IP address assigned | Limited or no connectivity | No public network address, + speed, network and signal strength |
| | IP address assigned | Connected | Standard connected tool-tip | a third state configured as a connecting state that indicates the network communications device is connected to the network medium and at least one of authenticating the network communications device or assigning a network address is being performed;

a fourth state configured as a warning state that indicates the network communications device is connected to the network medium and at least one of authentication of the network communications device failed or the assigned network address is invalid; and a fifth state configured as a connected state that indicates the network communications device is connected to the network, authentication of the network communications device is successful, and the assigned network address is valid;

responsive to failing to obtain a routable IP address, waiting a predetermined period of time before making an additional attempt to acquire the routable IP address using a DHCP client associated with the network communications device based on a state of a currently assigned IP address, a current state of the DHCP client, and a retry time indicating how long the DHCP client is configured to wait before again attempting to acquire the routable IP address and delaying output of an indication of the state of the attempt until after the additional attempt; and responsive to determining to indicate the state of the attempt as one of the second state, third state, fourth state, or fifth state, informing the user of the state of the attempt by causing a single unified icon to be displayed that is configured to represent the determined state of the attempt in accordance with an internal state that tracks a combination of a device specific state, an authentication specific state, and a IP-specific state for a network adapter.

2. The computer readable medium of claim 1, wherein attempting to join a network comprises undergoing an authentication procedure.

3. The computer readable medium of claim 1, wherein when the state of the attempt is in the fourth state configured as the warning state, informing the user how to repair a problem causing the attempt to be in the fourth state configured as the warning state.

4. The computer readable medium of claim 1, wherein the network is a TCP/IP network.

5. The computer readable medium of claim 4, wherein the network address is an IPv4 address.

6. The computer readable medium of claim 5, wherein, when one of IP status checking and 802.1x protocol are disabled determining the state of the attempt to be in the third state if the computer system is connected to the network medium.

7. The computer readable medium of claim 6, wherein informing the user of the state includes displaying an icon on a desktop of an operating system.

8. The computer readable medium of claim 7, wherein:
the single unified icon is a first graphic when the state of the attempt is in the second state;
the single unified icon is a second graphic when the state of the attempt is in the third state;
the single unified icon is a third graphic when the state of the attempt is in the fourth state; and
the single unified icon is a fourth graphic when the state of the attempt is in the fifth state.

9. The computer readable medium of claim 8, wherein the process further comprises detecting a change in the state of the attempt and informing the user of the change by causing the single unified icon to be changed.

10. A computer readable medium other than a signal per se having a sequence of instructions which, when executed by a processor that is a functional component of a network communications device, causes the processor to provide a graphical user interface configured to display a single unified icon that indicates different states associated with attempts to connect to a network using a DHCP client associated with the network communications device with different graphics, such that:

the single unified icon represents an internal state, which corresponds to a combination of a device specific state, an authentication specific state, and an IP-specific state for a network adapter;

responsive to failure of a particular attempt to acquire a routable IP address, display of a determined state for the particular attempt via the single unified icon is delayed to enable an additional attempt to acquire the routable IP address after waiting a predetermined period of time based on a state of a currently assigned IP address, a current state of the DHCP client, and a retry time indicating how long the DHCP client is configured to wait to make the additional attempt; and the single unified icon when displayed to indicate a state determined for the attempts is represented using one of:

a first graphic to signify that the network communications device is not connected to a network medium, responsive to detecting that the network communications device is unable to establish a wired network connection or a wireless network connection;

a second graphic to signify that the network communications device is connected to the network medium and at least one of authenticating the network communications device or assigning a network address is being performed;

a third graphic to signify that the network communications device is connected to the network medium and at least one of authentication of the network communications device failed or the assigned network address is invalid; or a fourth graphic to signify that the network communications device is connected to the network, authentication of the network communications device is successful, and the assigned network address is valid.

11. The computer readable medium of claim 10, wherein the network is a TCP/IP network.

12. The computer readable medium of claim 11, wherein the network address is an IPv4 address.

13. The computer readable medium of claim 12, wherein, when one of IP status checking and 802.1x protocol are disabled the single unified icon is displayed as the second graphic if the computer system is connected to the network medium.

14. The computer readable medium of claim 10, wherein one of the first graphic, the second graphic, the third graphic, and the fourth graphic is displayed in the system tray.

15. The computer readable medium of claim 10, wherein clicking on one of the first graphic, the second graphic, the third graphic, and the fourth graphic launches a dialog box.

16. A method implemented by a network communications device, to inform a user of a network connection status, the method comprising:
attempting to acquire a routable IP address using a DHCP client associated with the network communications device;

informing the user that the state of the attempt is in an acquiring state;

failing to obtain the routable IP address;

waiting a predetermined period of time before making a second attempt to acquire the routable IP address and determining to delay informing a user of a warning state until after the second attempt is performed, wherein the determination to delay is based on a state of a currently assigned IP address, a current state of the DHCP client, and a retry time indicating how long the DHCP client is configured to wait before again attempting to acquire the routable IP address; and informing a user that the DHCP client has failed to acquire the routable IP address only after the second attempt using a single unified icon representative of an internal state, which tracks a network adapter configured to evaluate a combination of states including a device specific state, an authentication specific state, and a IP-specific state for the network adapter, the single unified icon being configured to represent different states using different graphics including:

a first graphic to signify that the network communications device is not connected to a network medium responsive to failure to establish a wired network connection or a wireless network connection;

a second graphic to signify that the network communications device is connected to the network medium and at least one of authenticating the network communications device or assigning a network address is being performed;

a third graphic to signify that the network communications device is connected to the network medium and at least one of authentication of the network communications device failed or the assigned network address is invalid; and a fourth graphic to signify that the network communications device is connected to the network, authentication of the network communications device is successful, and the assigned network address is valid.

* * * * *